United States Patent
Ringer et al.

[11] Patent Number: 5,901,965
[45] Date of Patent: May 11, 1999

[54] BELLOWS SEAL HAVING BALANCED, DE-COUPLED SEAL RING AND SEAL RING SHELL

[76] Inventors: Yoram Ringer, Grinnell, 1467 Elmwood Ave., Cranston, R.I. 02910; David Casucci, c/o EG&G Sealol, 60 Sharpe Dr., Cranston, R.I. 02920

[21] Appl. No.: 08/808,457

[22] Filed: Feb. 28, 1997

Related U.S. Application Data

[60] Provisional application No. 60/012,684, Mar. 1, 1996.

[51] Int. Cl.[6] ..................................................... F16J 15/34
[52] U.S. Cl. ........................... 277/369; 277/361; 277/389
[58] Field of Search ..................................... 277/361, 366, 277/369, 372, 384, 389, 397

[56] References Cited

U.S. PATENT DOCUMENTS

| | | | |
|---|---|---|---|
| 3,559,771 | 2/1971 | Crane | 188/71.8 |
| 4,889,350 | 12/1989 | Tranter | 277/88 |
| 5,498,007 | 3/1996 | Kulkarni et al. | 277/366 X |
| 5,529,315 | 6/1996 | Borrino et al. | 277/361 X |
| 5,544,897 | 8/1996 | Di Pietro et al. | 277/389 |
| 5,718,560 | 2/1998 | Lorenzen | 277/361 X |

OTHER PUBLICATIONS

Sales Brochure for "Type 2800 for Non–Contacting, Dry Running Double Cartridge Seal", John Crane Inc. 6 pages, nominal publication date 1993.

Sales Brochure for "Type 1215 and 2215 Metal Bellows Cartridge Seals," John Crane Inc., 1991.

EG&G Sealol, Inc.—Redacted page from Distributor's Release Illustrating Type 631 Welded Metal Bellows Cartridge Seal.

EG&G Sealol, Inc. Industrial Division—Drawing No. 0704519 R/S (Rev.A)—Nominal date Jun. 28, 1991, Date of publication or First Use sometime in 1991–92.

Sales Brochure for "5615 and 5625 Universal Cartridge Metal Bellows Seal" John Crane Inc. Sep. 1996 (Nominal Publication Date).

*Primary Examiner*—Anthony Knight
*Assistant Examiner*—Gary Grafel
*Attorney, Agent, or Firm*—Dorn, McEachran, Jambor & Keating

[57] ABSTRACT

A balanced, de-coupled seal assembly for use in a bellows seal having a mating rotating seal assembly, wherein the seal is used for sealing a process fluid along a rotatable shaft extending from a machine body. The seal assembly includes a seal ring, a seal ring shell mating with and de-coupled from the seal ring, and a flexible O-ring between the seal ring and the seal ring shell. The O-ring is provided at a location so to balance the seal ring and seal ring shell under both normal and reverse pressure conditions and to prevent the process fluid from leaking between the seal ring and the seal ring shell.

26 Claims, 4 Drawing Sheets

BELLOWS SEAL HAVING BALANCED, DE-COUPLED SEAL RING AND SEAL RING SHELL

CROSS-REFERENCE TO RELATED INVENTIONS

This invention is based on co-pending U.S. Provisional patent application Ser. No. 60/012,684, filed on Mar. 1, 1996 now abandoned. The subject matter of this invention is also related to co-pending U.S. patent application Ser. No. 08/895,501, filed Jul. 16, 1997 and to co-pending U.S. patent application Ser. No. 08/683,733 filed Jul. 18, 1996.

BACKGROUND OF THE INVENTION

1. Field of the Invention

The present invention relates to a seal, and more specifically to a bellows seal having a balanced, de-coupled seal ring and seal ring shell.

2. Discussion of the Related Art

Pumps, especially those in refineries and chemical plants, often handle difficult-to-seal liquids, including propane, butane, and other unstable, combustible, or toxic liquids. These liquids can cause short seal life and undesirable product leakage, prompting the passage of state health and safety pump emission regulations.

Figure 5:
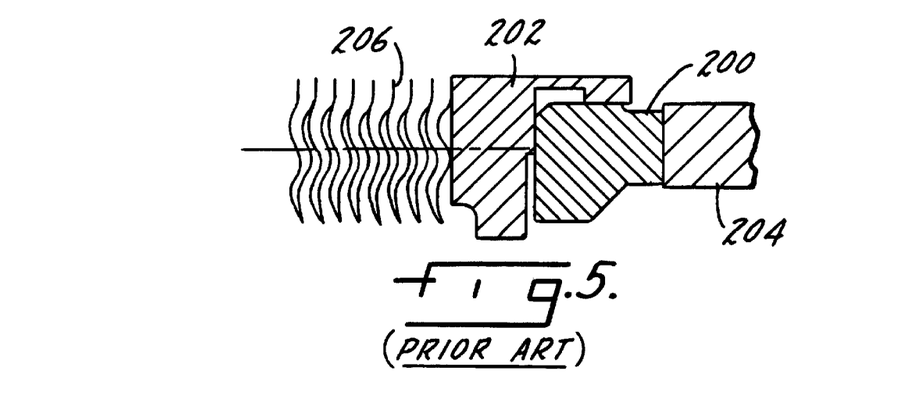
FIG. 5 is a cross-sectional view of a conventional non-contacting bellows seal.

FIG. 5 shows a conventional bellows seal. A stationary assembly of the seal includes a stationary seal ring 200 fitted against a stationary seal ring shell 202 using a press fitting or a thermal shrink fitting technique, and a bellows 206 attached to a side of seal ring shell 202 opposite seal ring 200. Press fitting or thermal shrink fitting provides a very tight interference fit between stationary seal ring 200 and seal ring shell 202, wherein stationary seal ring 200 is radially and axially fixed to seal ring shell 202. In press fitting, mating parts, on which the outer dimension of the interior member is the same as or slightly greater than the interior dimension of the exterior member, are forced together. In shrink fitting, the parts are joined by contracting (shrinking) the interior part by cooling and inserting the interior part into the exterior part. Subsequent expansion of the interior part by its return to ambient temperature ensures a tight fit. Alternatively, the parts are joined by expanding the exterior part by heating and inserting the interior part into the exterior part. Subsequent contraction of the exterior part by its return to ambient temperature ensures a tight fit.

The interference fit between stationary seal ring 200 and stationary seal ring shell 202, acts as a secondary static seal prohibiting sealed process fluid from leaking between stationary seal ring 200 and stationary seal ring shell 202. Also, the contact friction between stationary seal ring 200 and stationary seal ring shell 202 caused by the interference fit prohibits relative circumferential movement of stationary seal ring 200 with respect to stationary seal ring shell 202. However, in order for this to occur, the friction between stationary seal ring 200 and stationary seal ring shell 202 must be greater than the rubbing friction created between the seal ring face and its mating rotating seal ring 204. Further, the interference fit between stationary seal ring 200 and stationary seal ring shell 202 prevents relative axial movement of stationary seal ring 200 with respect to stationary seal ring shell 202. To prohibit axial movement, however, the friction force between stationary seal ring 200 and stationary seal ring shell 202 must be greater than any axial forces exerted on stationary seal ring 200 at radially-extending surfaces of stationary seal ring 200 that are exposed to the hydrostatic pressure of the process fluid.

The interference fit between stationary seal ring 200 and stationary seal ring shell 202 also produces unwanted stresses in stationary seal ring 200 that cause seal ring face distortion, i.e., the seal ring face is twisted or bent. In bellows seal applications, however, it is preferred that the stationary seal ring be free from such face distortions. For example, in pump applications operating under normal pressure conditions, it is necessary for the seal ring to have a flat face. If a facially distorted seal ring is used in such applications, then the seal ring experiences unusual wear, shortening the life of the seal ring.

SUMMARY OF THE INVENTION

An object of the invention, therefore, is to provide an improved bellows seal in which a stationary or rotary seal ring and seal ring shell are free from unwanted stresses caused by an interference fit, the seal ring face is free from facial distortions caused by the interference fit, and process fluid is prevented from leaking between the seal ring and seal ring shell.

Additional objects and advantages of the invention will be set forth in part in the description which follows, and in part will be obvious from the description, or may be learned by practice of the invention.

To achieve the objects and in accordance with the purpose of the invention, the invention comprises a seal assembly for use in a seal for sealing a low pressure area from a high pressure area, wherein the seal assembly includes a bellows, a seal ring shell having a portion attached to the bellows, a seal ring de-coupled from and mating with another portion of the seal ring shell, and a seal element between the seal ring shell and the seal ring at a location that provides balance under normal and reverse pressure conditions.

According to another aspect, the invention comprises a seal for sealing a low pressure area from a high pressure area, the seal including an inboard seal, and an outboard seal axially spaced from the inboard seal, wherein at least one of the inboard and outboard seals have a seal assembly. The seal assembly comprises a bellows, a seal ring shell having a portion attached to the bellows, a seal ring de-coupled from and mating with another portion of the seal ring shell, and a seal element between the seal ring shell and the seal ring at a location that provides balance under normal and reverse pressure conditions.

It is to be understood that the foregoing general description and the following detailed description are exemplary and explanatory only and are not restrictive of the invention as claimed.

BRIEF DESCRIPTION OF THE DRAWINGS

The accompanying drawings are included to provide a further understanding of the invention and are incorporated in and constitute part of the specification, illustrate a preferred embodiment of the invention, and, together with a description, serve to explain the principles of the invention.

DETAILED DESCRIPTION OF THE PREFERRED EMBODIMENTS

Reference will be made in detail to the present preferred embodiments of the invention, examples of which is illustrated in the accompanying drawings. Like reference numerals refer to like parts in the various figures of the drawings.

The present invention is directed to a seal in which the stationary or rotary assembly includes a balanced, de-coupled seal ring and seal ring shell. The seal ring and seal ring shell are de-coupled, i.e., not integrally fitted together like the conventional seal, freeing the seal ring from facial distortions and the unwanted stresses caused by an interference fit.

Furthermore, the seal ring and seal ring shell can be used in a single seal, or a double seal where a buffer fluid pressure is supplied at a pressure higher than a process fluid to be sealed in order to prevent leakage of the process fluid across the seal ring face. Should a sudden drop of buffer fluid pressure occur so that the pressure of the process fluid exceeds that of buffer fluid, a so-called "pressure reversal" occurs. In such a double seal, the seal ring and seal ring shell are balanced during normal pressure conditions and under reverse pressure conditions, preventing process fluid from leaking between the seal ring and the seal ring shell.

In the disclosed embodiment, the seal includes inboard and outboard non-contacting bellows seals that are balanced under normal operating conditions, i.e., when the buffer fluid pressure exceeds the process fluid pressure, and under reverse pressure conditions, i.e., when the process fluid pressure exceeds the buffer fluid pressure. The general purpose of such a seal is to seal rotating equipment from leaking an internal process fluid or gas to the atmosphere. The seal is suitable for use in pumps, centrifugal gas compressors, gas or steam turbines, gas expanders, or other industrial applications, and also aerospace applications, including jet engines, turbo compressors, and cryogenics.

The seal shown, which incorporates the the teachings of the present invention, is a double seal since it includes both an inboard seal and an outboard seal axially separated along a rotating shaft of the equipment to define a chamber therebetween. Furthermore, the seal ring and seal ring shell of the present invention may be incorporated in either or both the inboard seal and outboard seal. Thus, the seal ring and seal ring shell may be included in a single seal having only an inboard seal or only an outboard seal. During normal operation of the double seal, the chamber accepts a buffer fluid at a pressure exceeding that of the process fluid to separate the sealing faces of the stationary and rotating seal rings of both the inboard and outboard seals.

In each stationary assembly of the double seal to be described, a contact force between the stationary seal ring and stationary seal ring shell is minimized by balancing and de-coupling the stationary seal ring and seal ring shell. This disclosure includes a detailed discussion of the stationary assembly of the inboard seal. It is to be understood that the structure and operation of the stationary assembly of the outboard seal is similar to that of the stationary assembly of the inboard seal. The benefits achieved by the stationary assembly of the inboard seal of the present invention can be equally achieved by the stationary assembly of the outboard seal.

As will be described, the stationary assembly of the inboard seal includes a seal element provided at a specific location between the stationary seal ring and stationary seal ring shell so to balance and de-couple the stationary seal ring and seal ring shell, eliminating axial separation of the stationary seal ring from the seal ring shell during normal or reverse pressure conditions. A bellows is also provided and defines fluid pressure boundaries so that fluid pressure forces cause the stationary and rotating seal rings to move axially, causing the sealing faces of the stationary and rotating seal rings to close. The bellows compresses under reverse pressure conditions, increasing a mechanical spring force provided by the bellows, and expands under normal pressure conditions.

Figure 1:
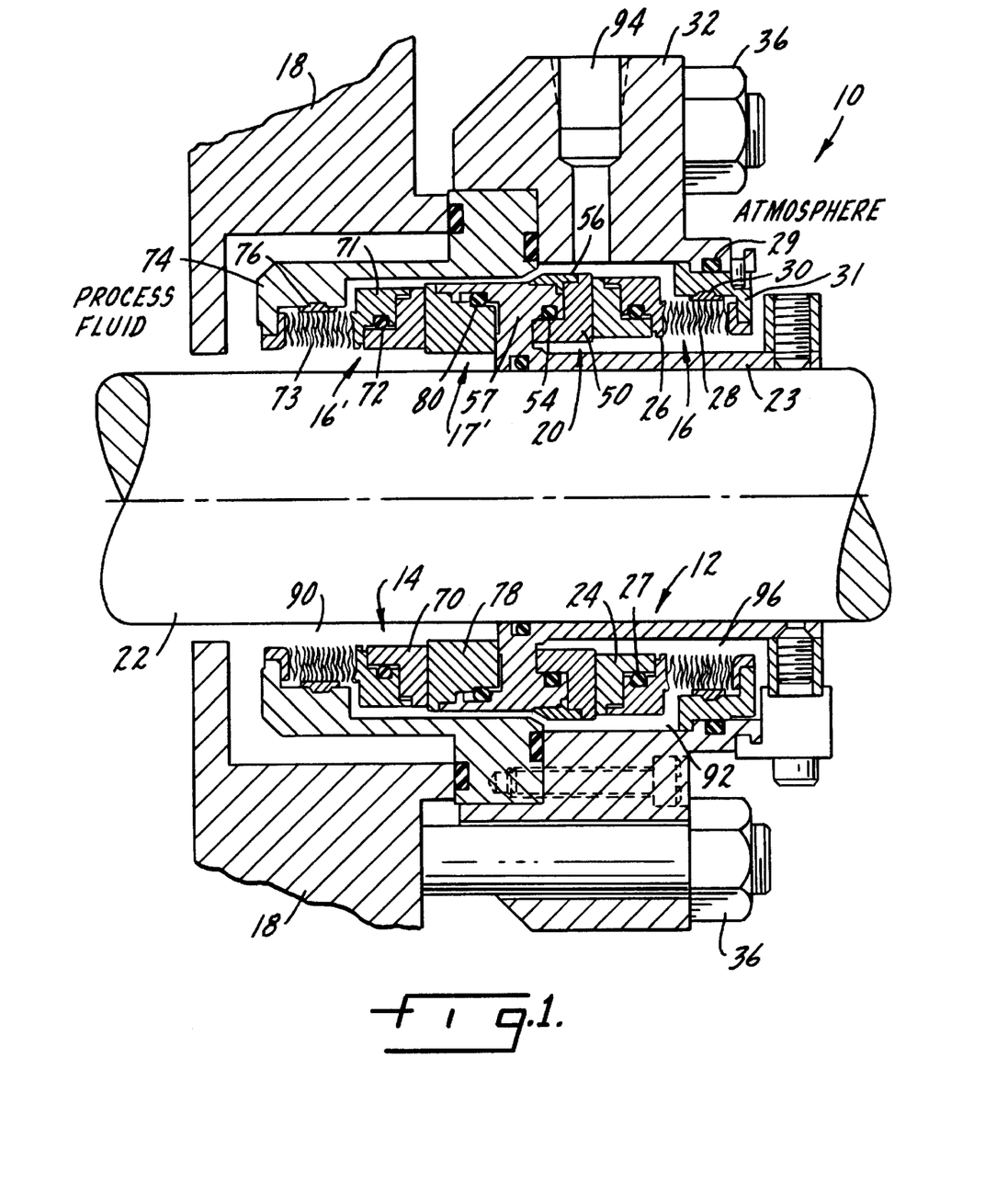
FIG. 1 is a cross-sectional view of a bellows seal which incorporates the teachings of the present invention.

The double seal embodiment shown in FIG. 1 is denoted generally by reference numeral 10. Seal 10 includes an outboard seal 12 and an inboard seal 14. Outboard seal 12 consists of a stationary assembly 16 attached to a machine body 18 and a rotary assembly 20 attached to a sleeve 23 mounted around a rotary shaft 22.

Stationary assembly 16 includes a stationary seal ring 24, a seal ring shell 26 and an O-ring secondary seal 27. Stationary assembly 16 further includes an O-ring secondary seal 29, a bellows 28, a damper strip 30, an adaptive end fitting 31, and an adaptive housing 32. All of these components are annular.

Stationary seal ring 24 is preferably made of silicon carbide and includes a stator sealing face facing the inboard side. O-rings 27 and 29 preferably consist of synthetic rubber and provide a secondary seal. Adaptive housing 32 is designed as required for proper installation onto particular equipment. Preferably, a plurality of socket head cap screws 36, or other suitable fasteners such as hex nuts, are used to attach housing 32 to machine body 18.

Bellows 28 is a flexible member preferably welded to seal ring shell 26. Bellows 28 acts as both a flexible member and a dynamic secondary seal. Bellows 28 flexes to accommodate axial motion and run out. (Run out is the angular misalignment of the rotating seal ring with respect to the shaft axis.) Bellows 28 preferably consists of individual thin plates, each approximately 0.12–0.20 millimeters in thickness, with male and female fittings for proper nesting within one another. During operation, bellows 28 is prone to vibration.

Rotary assembly 20 of seal 12 includes a rotating seal ring 50, an O-ring secondary seal 54, and a rotor adapter 56 seated within a flange portion 57 of sleeve 23. All of these components are annular. As with O-rings 27 and 29, O-ring 54 preferably is made of synthetic rubber and provides a secondary seal.

Figure 7:
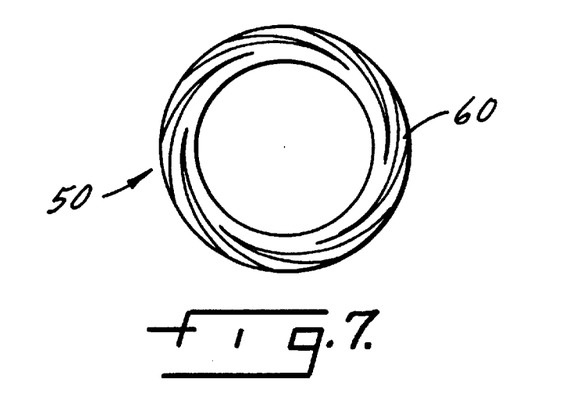
FIG. 7 is a plan view of a rotor sealing face used in the bellows seal according to the present invention.

Rotating seal ring 50 preferably consists of sintered silicon carbide, or other suitable materials known in the art, chosen for its short lead time (i.e., time required to develop the rotor for use), low cost, and high strength to weight ratio. Rotating seal ring 50 has a sealing face opposing the sealing face of stationary seal ring 24. Outboard seal 12 can be a contacting seal in which the sealing face of rotating seal ring 50 is flat, and thus, contacts stationary seal ring 24. Alternatively, outboard seal can be a non-contacting in which the rotating seal ring face includes spiral grooves 60 formed thereon, as shown in FIG. 7. Grooves 60 are preferably shallow, however, the groove design can be altered for a particular application. In addition, the grooves can be incorporated in the stationary seal ring face instead of the rotating seal ring face.

Grooves 60 provide both hydrostatic (i.e., non-rotating) and hydrodynamic (rotating) forces for separating the stator and rotor sealing faces. When rotating seal ring 50 is exposed to a pressurized gas, the gas enters the grooves 60 and provides an opening force.

Inboard seal 14 may also be a contacting or non-contacting seal comprising a stationary assembly 16' and a rotary assembly 17' having similar components as outboard seal 12. Stationary assembly 16' includes a stationary seal ring 70, a seal ring shell 71, an O-ring secondary seal 72, and a bellows 73. Bellows 73 attaches to a gland 74 which connects to machine body 18.

Rotary assembly 17' of inboard seal 14 includes a rotating seal ring 78 and an O-ring secondary seal 80 between seal ring 78 and the flange portion 57 of sleeve 23. As shown in FIG. 1, the radial diameter of O-ring 80 is the same as the radial diameter of O-ring 72. As will be described, the radial diameter of O-ring 72 effects the operation of seal 10 under normal and reverse pressure conditions.

Seal ring 78 has a sealing face opposing a sealing face of stationary seal ring 70. The face of rotating seal ring 78 may be flat but preferably includes spiral grooves for separating the sealing faces. In the alternative, as in the outboard seal, the face of stationary seal ring 70 may incorporate the spiral grooves.

Figure 6:
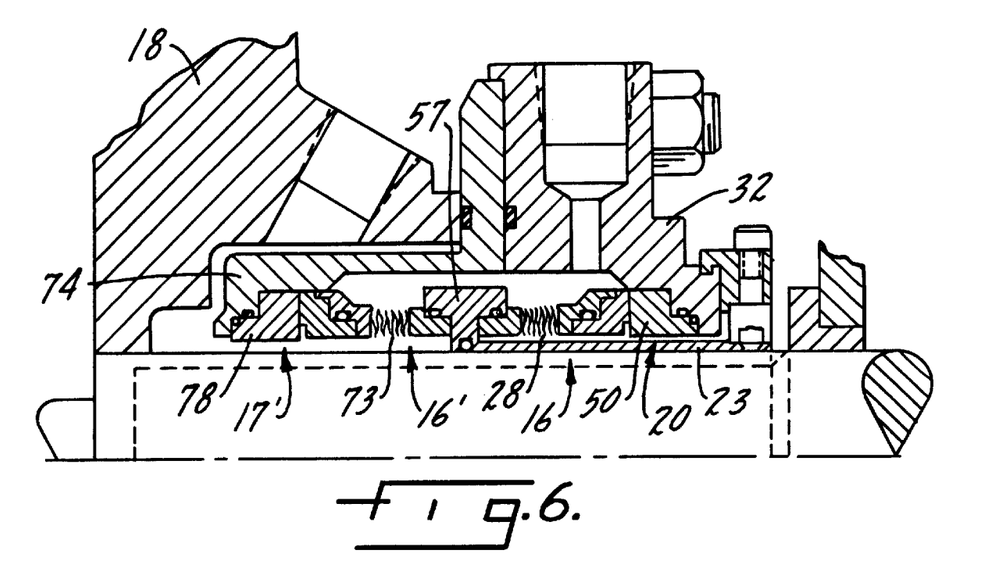
FIG. 6 is a cross-sectional view of another bellows seal which incorporates the teachings of the present invention.

Furthermore, as shown in FIG. 6, both outboard seal 12 and inboard seal 14 can be inverted so that the bellows 28, 73 attach to flange portion 57 of sleeve 23, and seal rings 50, 78 attach to adaptive housing 32 and the gland 74 connected to machine body 18, respectively. In this arrangement, assemblies 16, 16' are rotary, and assemblies 20, 17' are stationary.

Figure 2:
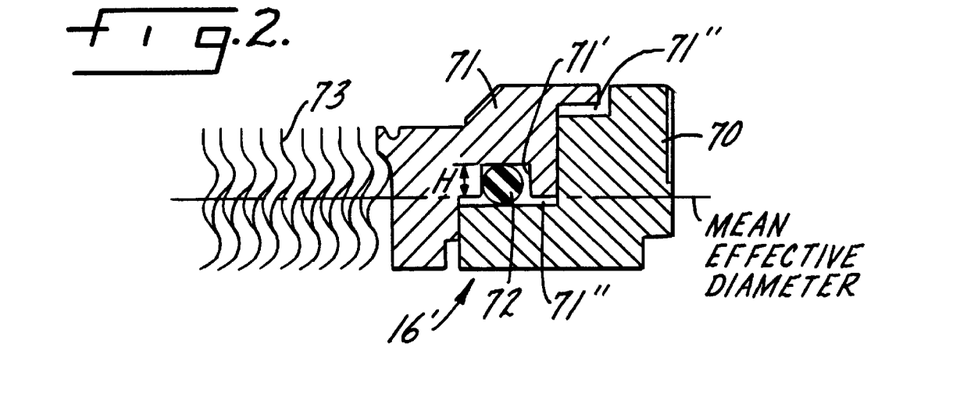
FIG. 2 is a cross-sectional view of the inboard stationary assembly of the FIG. 1 seal.

FIG. 2 shows a cross-sectional view of stationary assembly 16' of inboard seal 14. As shown, O-ring 72 is provided in an annular notch 71' formed in seal ring shell 71 and abuts a surface of stationary seal ring 70. However, unlike the conventional seal where the seal ring and seal ring shell are integrally fitted together, O-ring 72 enables seal ring 70 to be de-coupled from seal ring shell 71, preferably by providing a gap 71" between seal ring 70 and seal ring shell 71. Gap 71" is created since the thickness of O-ring 72 under normal operation is greater than the height H of annular notch 71', and prevents seal ring 70 from contacting seal ring shell 71 in the radial direction. Seal ring 70 contacts seal ring shell 71 in the axial direction, but the two mating parts are not integrally fitted together. Preferably, an O-ring is used to de-couple the seal ring from the seal ring shell. However, other suitable resilient sealing members, such as elastomers, flexible graphite, or plastic, may be used.

With reference to FIG. 1, machine body 18, outboard seal 12, and rotary sleeve 23 define three annular chambers. During operation, a first chamber 90 contains process fluid, while a second chamber 92 contains buffer fluid supplied from a port 94 of the adaptive housing 32. Preferably, the buffer fluid is a gas, most preferably an inert gas such as nitrogen. A third annular chamber 96 is open to the atmosphere and is defined by sleeve 23 and seal 12.

Initially, prior to operation, the sealing faces of both the inboard and outboard seals are contacting due to the mechanical spring force supplied by bellows 73 and 28 respectively. The spring force produces a low static face pressure to promote quick lift-off and minimizes wear should face contact occur at start-up and shut-down of rotation.

During operation and rotation of shaft 22, a buffer fluid, preferably nitrogen or air, is supplied through port 94 to chamber 92. Under normal operation, the buffer fluid is supplied at a pressure above atmospheric pressure and, preferably, at a pressure slightly higher than that of the process fluid to ensure no leakage of process fluid into chamber 92.

As shaft 22 rotates and spins rotating seal rings 50 and 78, and as fluid pressure is applied to the chamber 92, fluid flows into the grooves of rotating seal rings 50 and 78 and is pumped inward creating a high opening pressure. At both the inboard and outboard seals, the sealing faces of rotating seal rings 50, 78 and stationary seal rings 24, 70 separate and a thin film of fluid forms therebetween.

Figure 3A:
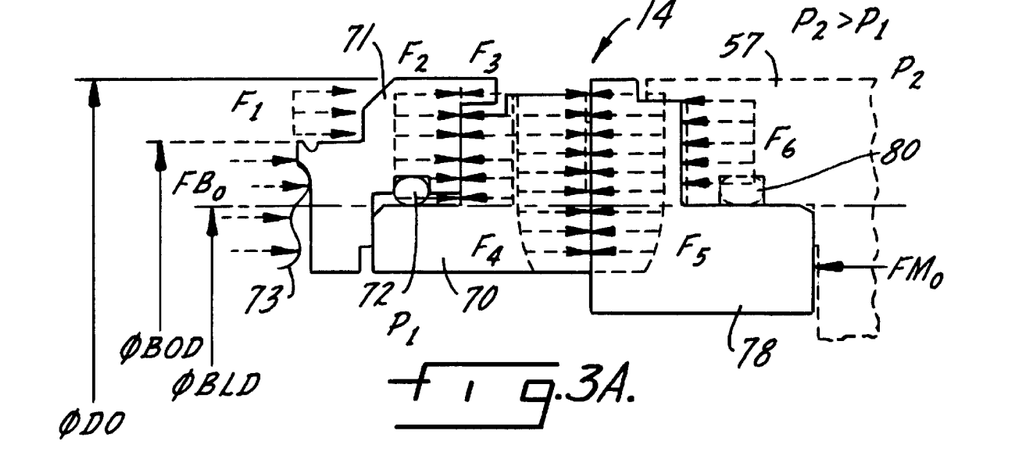
FIGS. 3A and 3B are cross-sectional free-body force diagrams of the inboard seal of the FIG. 1 seal, showing forces during normal operation.
Figure 3B:
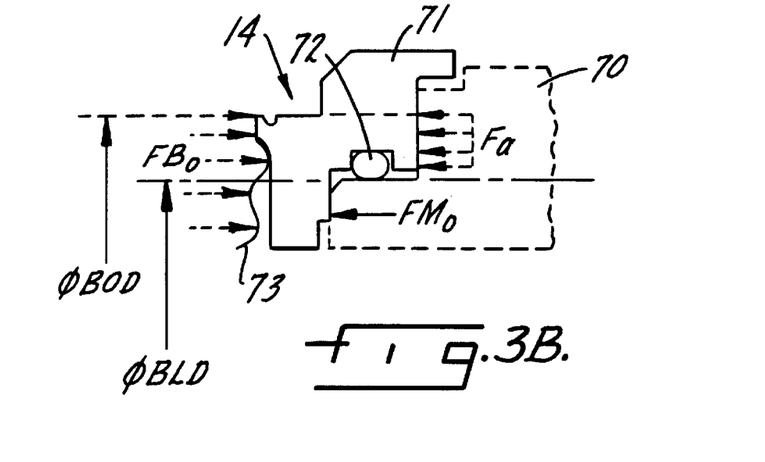

FIGS. 3A and 3B illustrate the forces acting on inboard seal 14 during normal operating conditions, i.e., the buffer fluid pressure $P_2$ exceeds the process fluid pressure $P_1$. For ease of discussion, FIGS. 3A and 3B and the other free-body force diagrams discussed herein show only the absolute forces acting on the seal that result from the difference in pressure between the buffer fluid and the process fluid. Only these absolute forces will be described.

Under normal operating conditions, bellows 73 supplies a force $FB_o$ acting in the outboard direction to oppose the opening of the sealing faces of the stationary and rotating seal rings 70 and 78. The bellows force FB, consists of two components: one resulting from the mechanical bellows spring force and another resulting from the hydraulic pressure forces.

The buffer fluid supplies a force $F_1$ acting on the back face of seal ring shell 71 down to the outer diameter BOD of bellows 73. $F_1$ acts in the outboard direction. The buffer fluid also supplies equal and opposite forces $F_2$ and $F_3$ acting on the opposing faces of seal ring shell 71 and stationary seal ring 70. $F_2$ and $F_3$ act on these faces down to the radial diameter of O-ring 72, and cancel each other out.

As mentioned, the spiral grooves of rotating seal ring 78 force buffer fluid inward, creating a high opening pressure between the sealing faces of the stationary and rotating seal rings 70 and 78. The forces created by this pressure are represented in FIG. 3A as equal and opposite forces $F_4$ and $F_5$. These forces cancel each other out.

The buffer fluid further provides a force $F_6$ acting on the back face of rotating seal ring 80 in the inboard direction down to the radial diameter BLD (a so-called "balance diameter") of O-ring 72. Since the radial diameter of O-ring 80 and the radial diameter BLD of O-ring 72 are the same, force $F_6$ is equal to force $F_3$. Thus, force $F_2$ cancels with either force $F_3$ or force $F_6$. A contact force $FM_o$ caused by the contact between rotating seal ring 78 and the flange portion 57 of sleeve 23 also acts on the back face of seal ring 78, in an inboard direction.

The net of these forces must equal zero:

$$FB_o + F_1 + F_2 - F_3 + F_4 - F_5 - F_6 - FM_o = 0 \qquad (\text{eq. 1})$$

Canceling $F_2$, $F_3$, $F_4$, and $F_5$ results in:

$$FM_o = FB_D + F_1 - F_6 \qquad (\text{eq. 2})$$

$$As F_1 = \Delta P \times \frac{\Pi}{4} \times (DO^2 - BOD^2), \Delta P = (P_1 - P_2) < 0 \qquad (\text{eq. 3})$$

and $$F_6 = \Delta P \times \frac{\Pi}{4} \times (DO^2 - BLD^2), \qquad (\text{eq. 4})$$

then $$FM_o = FB_o = \Delta P \times \frac{\Pi}{4} \times (BOD^2 - BLD^2). \qquad (\text{eq. 5})$$

FIG. 3B shows the resulting forces acting on seal ring shell 71 under normal pressure conditions. FIG. 3B is a free body force diagram of seal ring shell 71 only. Force $FM_o$ translates through rotating seal ring 78 and stationary seal ring 70 to seal ring shell 71.

With reference to equation 5, because the bellows selected has a force $FB_o>0$, $P_1-P_2<0$, and the outer diameter BOD of bellows 73 is greater than the radial diameter BLD of O-ring 72, force $FM_o>0$. As shown in FIG. 33, force $F_a$, which is force $F_1$ minus force $F_6$, will act to axially separate seal ring shell 71 from seal ring 70, while force $FB_o$ will act to keep seal ring shell 71 in contact with seal ring 70. For each application using seal 10, one must select a bellows in which force $FB_o$ is greater than force $F_a$ so that the axial contact force $FM_o$ is greater than zero, forcing seal ring shell 71 against stationary seal ring 70 and preventing axial movement of seal ring 70 relative to seal ring shell 71.

Should seal 10 experience a sudden loss of buffer fluid pressure so that the process fluid pressure exceeds the buffer fluid pressure, high process fluid pressure acting on the back face of rotating seal ring 78 will force seal ring 78 toward the inboard direction. Rotating seal ring 78, along with stationary seal ring 70 and seal ring shell 71, will continue to move to the left until an increased mechanical spring force of bellows 73, and high process fluid pressure forces acting on the back face of rotating seal ring 78 force the seal rings to close, preventing leakage of process fluid into chamber 92.

Figure 4A:
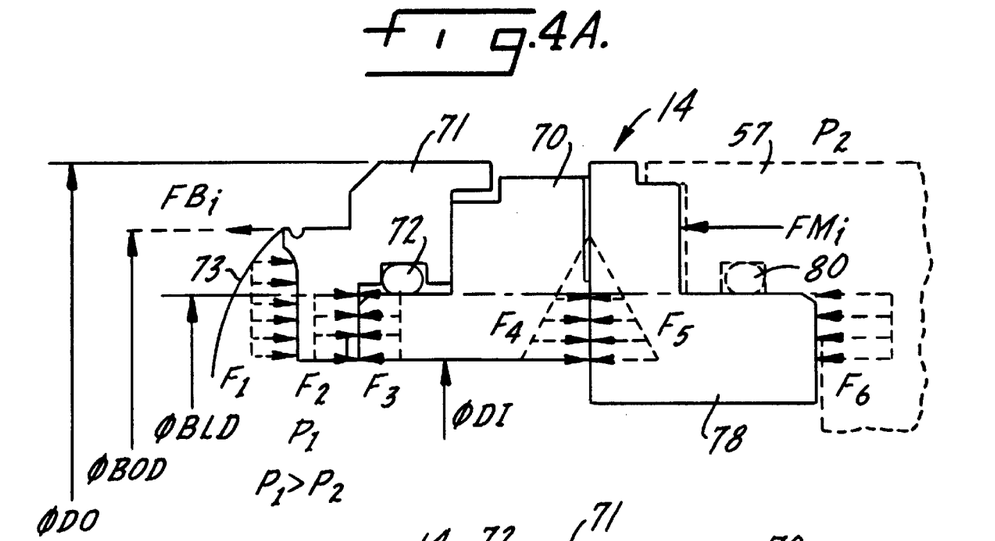
FIGS. 4A and 4B are cross-sectional free-body force diagrams of the inboard seal of the FIG. 1 seal, showing forces during reverse pressure conditions.
Figure 4B:
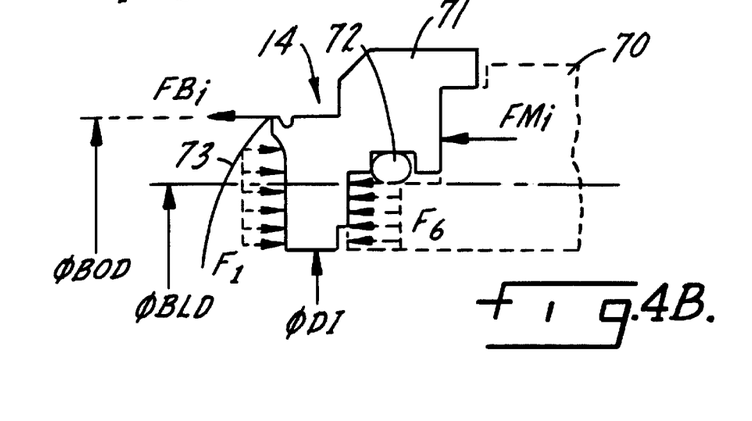

FIGS. 4A and 4B show the forces acting on inboard seal 14 under this reverse pressure situation, i.e., the process fluid pressure P1 exceeds the buffer fluid pressure $P_2$. A force $FB_i$ provided by bellows 73 acts in a direction opposite to $FB_o$ and compresses bellows 73. For each application using seal 10, it is preferable to select a bellows in which the direction of $FB_i$ is as shown in FIG. 4A. The process fluid applies a force $F_1$ at the back face of seal ring shell 71 up to the outer bellows diameter BOD. Force $F_1$ acts in the outboard direction. An axial contact force $FM_i$ caused by the contact between rotating seal ring 78 and the flange portion 57 of sleeve 23 also acts on the back face of seal ring 78, in an inboard direction.

Process fluid pressure also acts on opposing faces of ring shell 71 and stationary seal ring 70 up to the radial diameter BLD of O-ring 72, with resultant forces $F_2$ and $F_3$ being equal and opposite. These forces cancel each other out. Forces $F_4$ and $F_5$ are caused by process fluid between the seal faces and also oppose each other to cancel out. Process fluid also applies a force $F_6$ on the back face of rotating seal ring 78 up to the radial diameter BLD of O-ring 72. Force $F_6$ acts in the inboard direction and is equal to force $F_3$. Thus, force $F_2$ could be canceled with either force $F_3$ or force $F_6$.

The net of these forces must equal zero:

$$F_1+F_2-F_3+F_4-FB_i-F_5-F_6-FM_i=0 \quad \text{(eq. 6)}$$

Canceling $F_2$, $F_3$, $F_4$, and $F_5$ results in:

$$FM_i=F_1-F_6-FB_i \quad \text{(eq. 7)}$$

Since $$F_1 = \Delta P \times \frac{\Pi}{4}(BOD^2 - Dl^2), \Delta P = (P_1 - P_2) > 0, \quad \text{(eq. 8)}$$

and $$F_6 = \Delta P \times \frac{\Pi}{4}(BLD^2 - Dl^2), \quad \text{(eq. 9)}$$

then $$FM_i = \Delta P \times \frac{\Pi}{4} \times (BOD^2 - BLD^2) - FB_i. \quad \text{(eq. 10)}$$

FIG. 4B shows the resulting forces acting on seal ring shell 71 under reverse pressure conditions. FIG. 4B shows a free body force diagram of seal ring shell 71 only. Force $FM_i$ translates through rotating seal ring 78 and stationary seal ring 70 to seal ring shell 71.

With reference to equation 10, because the bellows selected has force $FB_i>0$, BOD>BLD, and $P_1-P_2>0$, force $FM_i>0$. As shown in FIG. 4B, under reverse pressure conditions, bellows force FB; and force $F_6$ act to separate seal ring shell 71 from stationary seal ring 70, while force $F_1$ acts to force seal ring shell 71 against seal ring 70. It is essential to select a bellows for a particular application such that force $F_1$ is greater than the sum of force $F_6$ and force $FB_i$ so that the axial contact force $FM_i$ is greater than zero, forcing seal ring shell 71 against seal ring 70 and preventing axial movement of seal ring 70 relative to seal ring shell 71.

A balanced seal ring and seal ring shell is achieved if the seal ring and seal ring shell properly seal, and maintain their axial positions relative to each other, under both normal and reverse pressure conditions. A radial diameter BLD of O-ring 72 needs to be found that is same under both normal and reverse pressure conditions. Since radial diameter BLD and force $FM_o$ are the only unknowns in equation 5 (normal pressure conditions), and radial diameter BLD and force $FM_i$ are the only unknowns in equation 10 (reverse pressure conditions), there are two equations with two unknowns. Thus, to find the radial diameter BLD in which the seal is balanced under both normal and reverse pressure conditions, it follows that if force $FM_o$ is set equal to force $FM_i$, a single radial diameter BLD can be found.

Thus, the radial diameter BLD is found by equating axial forces $FM_o$ and $FM_i$, and solving for BLD as follows:

$$FM_o=FM_i \quad \text{(eq. 11)}$$

$$FB_o - \Delta P \times \frac{\Pi}{4} \times (BOD^2 - BLD^2) = \quad \text{(eq. 12)}$$

$$\Delta P \times \frac{\Pi}{4} \times (BOD^2 - BLD^2) - FB_i$$

$$BLD = \left(BOD^2 - \frac{2(FB_i + FB_o)}{\Pi \times \Delta P}\right)^{\frac{1}{2}} \quad \text{(eq. 13)}$$

Through computer simulation that has been confirmed through testing, it has been found that in order for axial forces $FM_o$ and $FM_i$ to equate, the radial diameter BLD of O-ring 72 preferably should vary no more than ±0.030 inches from the bellows mean diameter, where bellows mean diameter =½×(bellows outer diameter BOD+bellows inner diameter Dl). A radial diameter outside this range will result in the bellows working to separate the seal ring shell from the seal ring, producing an unbalanced seal.

As shown above, the radial diameter BLD of O-ring 72 is dependent upon the type of bellows selected, and thus, is dependent upon the application requiring the bellows seal. Finding the radial diameter BLD so to properly place O-ring 72 requires selecting a bellows having a known outer diameter BOD and which exerts known forces $FB_o$ and $FB_i$ at various pressure differentials $\Delta P$. These known bellows values are used with equation 13 to calculate the radial diameter BLD of O-ring 72 for a particular application.

The invention will be further clarified by the following illustrative, but non-limiting example. In this example, a bellows having known inner and outer diameters and a known pressure differential were used in a computer simulated seal and an actual test model of a seal according to the present invention. In the example, a bellows manufactured by EG&G Sealol was used having an outer diameter BOD of 2.562 inches, and an inner diameter Dl of 2.062 inches. Pressure differential ΔP was set at different values (100, 200 and 300 psi) under both normal and reverse pressure conditions. Using these values, forces F3B$_o$ and FB$_i$ were found using computer simulation as confirmed by actual tests, providing the following:

TABLE 1

| ΔP (psi) Normal or Reverse | FB$_i$ (lbs.) | FB$_o$ (lbs.) |
|---|---|---|
| 100 | 80 | 110 |
| 200 | 167 | 213 |
| 300 | 245 | 326 |

Using the values shown in Table i and equation 13, set forth above, the radial diameter BLD was calculated at each ΔP. Using the calculated BLD and equations 5 and 10, both FM$_i$ and FM$_o$ were calculated as follows:

TABLE 2

| ΔP (psi) | BLD (in.) | FM$_i$ (lbs.) | FM$_o$ (lbs.) |
|---|---|---|---|
| 100 | 2.314 | 15 | 15 |
| 200 | 2.314 | 23 | 23 |
| 300 | 2.314 | 40 | 40 |

As shown in Table 2, there is no change in the radial diameter BLD of O-ring 72 as the pressure differential between the process fluid and the buffer fluid varies. Also, the radial diameter BLD is within the ±0.03 range, set forth above, of the mean diameter of the bellows used in this example (=½(2.562+2.062 inches)=2.312) Further, axial contact forces FM$_i$ and FM$_o$ increase with an increasing pressure differential ΔP, but remain equal to each other at any given pressure differential. Finally, as explained earlier in connection with FIGS. 3B and 4B, because axial contact forces FM$_i$ and FM$_o$, as tested, both have positive values, there will be no axial movement between seal ring 70 relative to seal ring shell 71. In light of this, the present invention provides a balanced, de-coupled seal ring and seal ring shell assembly for use under both normal and reverse pressure conditions.

The balanced, de-coupled seal ring 70 and seal ring shell 71 of the present invention provides many benefits over the conventional stationary seals. O-ring 72 provides a static secondary seal preventing process fluid from leaking radially or axially between seal ring 70 and seal ring shell 71. O-ring 72 preferably enables a clearance or gap 71" to be formed between seal ring 70 and seal ring shell 71, which avoids the problem of seal ring face distortions, resulting from interference fit stresses of conventional stationary seals. The contact friction between O-ring 72 and seal ring 70, and between O-ring 72 and seal ring shell 71, prohibits relative movement between seal ring 70 and seal ring shell 71 in the circumferential direction. It is preferable that the contact friction between O-ring 72 and seal ring 70, and O-ring 72 and seal ring shell 71, be greater than the frictional rubbing forces between seal ring 70 and its mating rotating ring 78. However, alternative mechanical devices, such as pins or lugs, could be used to prohibit relative movement of seal ring 70 and seal ring shell 71 in the circumferential direction.

It will be apparent to those skilled in the art that various modifications and variations can be made to the seal of the present invention without departing from the scope or spirit of the invention. Thus, it is intended that the present invention cover the modifications and variations of this invention provided they come within the scope of the appended claims and their equivalents.

What is claimed is:

1. A seal assembly for use in a seal for sealing a low pressure area from a high pressure area, comprising:
   a bellows;
   a seal ring shell having a portion attached to said bellows;
   a seal ring de-coupled from and mating with another portion of said seal ring shell; and
   a secondary seal disposed between said seal ring shell and said seal ring, said secondary seal having a thickness that provides a radial gap between said seal ring shell and said seal ring, said radial gap minimizing the contact between said seal ring shell and said seal ring.

2. A seal assembly according to claim 1, wherein the seal assembly is stationary seal assembly.

3. A seal assembly according to claim 1, wherein the seal assembly is a rotary seal assembly.

4. A seal assembly according to claim 1, wherein the seal is a non-contacting seal.

5. A seal assembly according to claim 1, wherein the seal is a contacting seal.

6. A seal assembly according to claim 1, wherein said seal ring shell has a notch for containing the O-ring, and the thickness of the O-ring is greater than a height of the notch thereby creating the radial gap between said seal ring shell and said seal ring.

7. A seal assembly according to claim 1, wherein said secondary seal is an O-ring.

8. A seal assembly according to claim 7, wherein contact friction between the O-ring and said seal ring shell, and between the O-ring and said seal ring prohibits relative movement between said seal ring shell and said seal ring in the circumferential direction.

9. A seal assembly according to claim 7, wherein contact friction between the O-ring and said seal ring shell, and the O-ring and said seal ring is greater than the frictional rubbing forces between said seal ring and its mating rotating ring.

10. A seal assembly according to claim 7 wherein the radial diameter of the O-ring is set to balance said seal ring shell and said seal ring under normal and reverse pressure conditions.

11. A seal assembly according to claim 10, wherein the radial diameter (BLD) of the O-ring is provided by the following formula:

$$BLD = \left(BOD^2 - \frac{2(FB_i + FB_o)}{\Pi \times \Delta P}\right)^{½}$$

where, BOD is the outer diameter of said bellows, FB$_i$ is a bellows force acting on said seal ring shell during reverse pressure conditions, FB$_o$ is a bellows force acting on said seal ring shell during normal pressure conditions, and ΔP is the pressure differential between the high pressure area and the low pressure area.

12. A seal assembly according to claim 11, wherein axial contact forces FM$_o$ and FM$_i$ between said seal ring shed and said seal ring under normal and reverse pressure conditions, respectively, increase with an increasing differential pressure ΔP, but remain equal to each other at any given pressure differential.

13. A seal assembly according to claim 10, wherein the radial sealing diameter of the O-ring is equal to ±0.03 inches+a mean diameter of said bellows, where the mean diameter of said bellows is equal to ½×(an outer diameter of said bellows+an inner diameter of said bellows).

14. A seal for sealing a low pressure area from a high pressure area, comprising:

an inboard seal; and an outboard seal axially spaced from said inboard seal, at least one of said inboard and outboard seals having a seal assembly including:

a bellows, a seal ring shell having a portion attached to the bellows, a seal ring de-coupled from and mating with another portion of the seal ring shell; and a secondary seal disposed between the seal ring shell and the seal ring, the secondary seal having a thickness that provides a radial gap between said seal ring shell and said seal ring, said radial gap minimizing contact between said seal ring shell and said seal ring.

15. A seal according to claim 14, wherein the seal assembly is stationary seal assembly.

16. A seal according to claim 14, wherein the seal assembly is a rotary seal assembly.

17. A seal according to claim 14, wherein the seal is a non-contacting seal.

18. A seal according to claim 14, wherein the seal is a contacting seal.

19. A seal according to claim 14, wherein said seal ring shell has a notch for containing the O-ring, and the thickness of the O-ring is greater than a height of the notch thereby creating the radial gap between said seal ring shell and said seal ring.

20. A seal according to claim 14, wherein said secondary seal is an O-ring.

21. A seal according to claim 20, wherein contact friction between the O-ring and said seal ring shell, and the O-ring and said seal ring is greater than the frictional rubbing forces between said seal ring and its mating rotating ring.

22. A seal according to claim 20, wherein contact friction between the O-ring and said seal ring shell, and between the O-ring and said seal ring prohibits relative movement between said seal ring shell and said seal ring in the circumferential direction.

23. A seal according to claim 20, wherein the radial diameter of the O-ring is set to balance said seal ring shell and said seal ring under normal and reverse pressure conditions.

24. A seal according to claim 23, wherein the radial sealing diameter of the O-ring is equal to ±0.03 inches+a mean diameter of said bellows, where the mean diameter of said bellows is equal to ½×(an outer diameter of said bellows+an inner diameter of said bellows).

25. A seal according to claim 23, wherein the radial diameter (BLID) of the O-ring is provided by the following formula:

$$BLD = \left( BOD^2 - \frac{2(FB_i + FB_o)}{\Pi \times \Delta P} \right)^{\frac{1}{2}}$$

where, BOD is the outer diameter of said bellows, $FB_i$ is a bellows force acting on said seal ring shell during reverse pressure conditions, $FB_o$ is a bellows force acting on said seal ring shell during normal pressure conditions, and $\Delta P$ is the pressure differential between the high pressure area and the low pressure area.

26. A seal according to claim 25, wherein axial contact forces $FM_o$ and $FM_i$ between said seal ring shell and said seal ring under normal and reverse pressure conditions, respectively, increase with an increasing differential pressure $\Delta P$, but remain equal to each other at any given pressure differential.

* * * * *